United States Patent
Eda et al.

(10) Patent No.: US 11,851,133 B2
(45) Date of Patent: Dec. 26, 2023

(54) ELECTRIC MOTOR-ASSISTED BICYCLE AND MOTOR CONTROL APPARATUS

(71) Applicant: YAMAHA HATSUDOKI KABUSHIKI KAISHA, Iwata (JP)

(72) Inventors: Kaoru Eda, Shizuoka (JP); Yoichiro Hattori, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 336 days.

(21) Appl. No.: 17/488,417

(22) Filed: Sep. 29, 2021

(65) Prior Publication Data

US 2022/0097799 A1      Mar. 31, 2022

(30) Foreign Application Priority Data

Sep. 30, 2020 (JP) .................................. 2020-166032

(51) Int. Cl.
  *B62M 6/50* (2010.01)
  *B62M 6/55* (2010.01)
  *B60L 3/00* (2019.01)

(52) U.S. Cl.
  CPC ................. *B62M 6/50* (2013.01); *B60L 3/00* (2013.01); *B62M 6/55* (2013.01)

(58) Field of Classification Search
  CPC .. B62M 6/50; B62M 6/55; B62M 6/45; B60L 3/00; B62J 45/411; B62J 45/412
  See application file for complete search history.

(56) References Cited

U.S. PATENT DOCUMENTS

| 6,163,148 A | * | 12/2000 | Takada | .................... G01L 3/105 |
| | | | | 324/226 |
| 10,035,559 B2 | | 7/2018 | Tsuchizawa | |
| 2022/0097799 A1 | * | 3/2022 | Eda | .......................... B60L 3/00 |

FOREIGN PATENT DOCUMENTS

| JP | 09-109983 A | 4/1997 |
| JP | 09-286377 A | 11/1997 |
| JP | 2001-122183 A | 5/2001 |
| JP | 2001-270486 A | 10/2001 |
| JP | 6534883 B2 | 6/2019 |

OTHER PUBLICATIONS

Official Communication issued in corresponding Japanese Patent Application No. 2020-166032, dated Oct. 4, 2022.

* cited by examiner

*Primary Examiner* — Bhavesh V Amin
(74) *Attorney, Agent, or Firm* — Keating & Bennett, LLP

(57) ABSTRACT

An electric motor-assisted bicycle includes a vehicle speed sensor to detect a vehicle speed, a torque sensor to detect a pedal force on a pedal connected to a crankshaft, a motor to generate an assist force that assists the pedal force, a motor controller to control the assist force by the motor depending on the pedal force and the vehicle speed, a threshold determiner to determine an unauthorized alteration determination threshold depending on the vehicle speed, and an unauthorized alteration detector to determine whether an unauthorized alteration has been made to the vehicle speed sensor or the torque sensor by comparing a running output and the unauthorized alteration determination threshold, wherein the running output is the sum of the assist force by the motor and the pedal force. If an unauthorized alteration has been made, a predetermined control is performed to address the unauthorized alteration.

14 Claims, 8 Drawing Sheets

ELECTRIC MOTOR-ASSISTED BICYCLE AND MOTOR CONTROL APPARATUS

CROSS-REFERENCE TO RELATED APPLICATION

This application is based upon and claims the benefit of priority of the prior Japanese Patent Application No. 2020-166032, filed on Sep. 30, 2020, the entire contents of which are incorporated herein by reference.

BACKGROUND OF THE INVENTION

1. Field of the Invention

The present invention relates to electric motor-assisted bicycles and motor control apparatuses for electric motor-assisted bicycles.

2. Description of the Related Art

An electric motor-assisted bicycle uses its motor to generate an assist force that assists a pedal force applied by the rider to the pedals. An upper limit for the ratio of the assist force by the motor to the pedal force by the rider is often set depending on the vehicle speed of the electric motor-assisted bicycle. In Japan, for example, different upper limits for that ratio are prescribed by law for the vehicle speed range below 10 km/h and for the range from 10 km/h and below 24 km/h. Further, it is stipulated that no assist by the motor shall occur when the vehicle speed is 24 km/h or higher.

In recent years, there has been a problematic increase in cases where commercially available electric motor-assisted bicycles are altered to disable such an upper limit for the assist force by the motor. Such alterations include, for example, altering the sensors and/or motor control system to manipulate information about vehicle speed, pedal force or the like used to control the assist force by the motor.

A technique to detect abnormalities in motor control is disclosed in JP Hei9(1997)-109983 A, which discloses a driving-force assist apparatus that monitors the supply, by the motor drive system, of electric power that is ultimately provided to the motor. The driving-force assist apparatus identifies failures in abnormal motor output control and addresses the problem. The driving-force assist apparatus restricts the assist driving force when a command value for the motor or a value of electric power being supplied is not lower than a control value for a set period of time.

JP Hei9(1997)-286377 A discloses an assist driving force control apparatus for an electric bicycle. When an abnormality occurs in the torque sensor unit, the assist driving force control apparatus detects it immediately and stops driving the motor that provides the assist driving force. When the assist driving force control apparatus determines that the pedals are not in positive rotation, the apparatus determines that an abnormality has occurred in the torque sensor unit if the output value detected by the torque sensor unit is larger than a predetermined control value.

Japanese Patent No. 6534883 discloses a control apparatus for a bicycle that controls the assist motor depending on the rotating speed of the wheels. If, for example, the sensor for detecting the rotating speed of the wheels has been altered to detect the rotating speed of the crankshaft, the control apparatus determines that the sensor is making a detection about the wrong rotating body, and prohibits the driving of the assist motor. This control apparatus determines whether a first sensor for outputting a signal reflecting the rotating speed of a rotating body provided in the bicycle and a second sensor for outputting a signal reflecting the rotating speed of a rotating body provided in the bicycle are making a detection about the same rotating body, based on the output by the first sensor and the output by the second sensor. When the apparatus determines that the first and second sensors are making a detection about the same rotating body, it prohibits the driving of the assist motor.

Conventional abnormality detection techniques, such as those disclosed in JP Hei9(1997)-109983 A and JP Hei9(1997)-286377 A, do not consider situations where, for example, vehicle speed, torque or the like detected by a sensor is manipulated. As such, conventional abnormality detection techniques may have difficulty detecting, in a reliable manner, an alteration that removes differentiated upper limits for assist force set for different vehicle speed ranges, for example.

Japanese Patent No. 6534883, mentioned above, is designed to determine whether there has been a type of alteration where a sensor to detect the rotation of a rotating body (for example, wheel) of the bicycle is reattached so as to detect the rotation of another rotating body (for example, crankshaft). This conventional determination arrangement requires a configuration that acquires signals reflecting sensors for two or more rotating bodies and the rotating speeds of these rotating bodies and performs a calculation to compare the rotating speeds, phases or cycles of the two or more rotating bodies. This means a complicated configuration for determination.

SUMMARY OF THE INVENTION

Preferred embodiments of the present invention provide electric motor-assisted bicycles and motor control apparatuses each having a simple configuration that is able to detect an unauthorized alteration in a motor control system.

An electric motor-assisted bicycle according to a preferred embodiment of the present invention includes a vehicle speed sensor to detect a vehicle speed of the electric motor-assisted bicycle, a torque sensor to detect a pedal force on a pedal connected to a crankshaft of the electric motor-assisted bicycle, a motor to generate an assist force that assists the pedal force, a motor controller configured or programmed to control the assist force by the motor depending on the pedal force and the vehicle speed, a threshold determiner configured or programmed to determine an unauthorized alteration determination threshold (referred to as "UA determination threshold") depending on the vehicle speed, and an unauthorized alteration detector (referred to as "UA detector") configured or programmed to determine whether an unauthorized alteration has been made to the vehicle speed sensor or the torque sensor by comparing a running output and the UA determination threshold, wherein the running output is a sum of the assist force by the motor and the pedal force. If the UA detector determines that an unauthorized alteration has been made, a predetermined control is performed to address the unauthorized alteration.

The advantages and benefits of the preferred embodiments of the present invention are achieved by the features and combinations thereof described below. It is to be understood that both the foregoing general description and the following detailed description are exemplary and explanatory only and are not restrictive of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
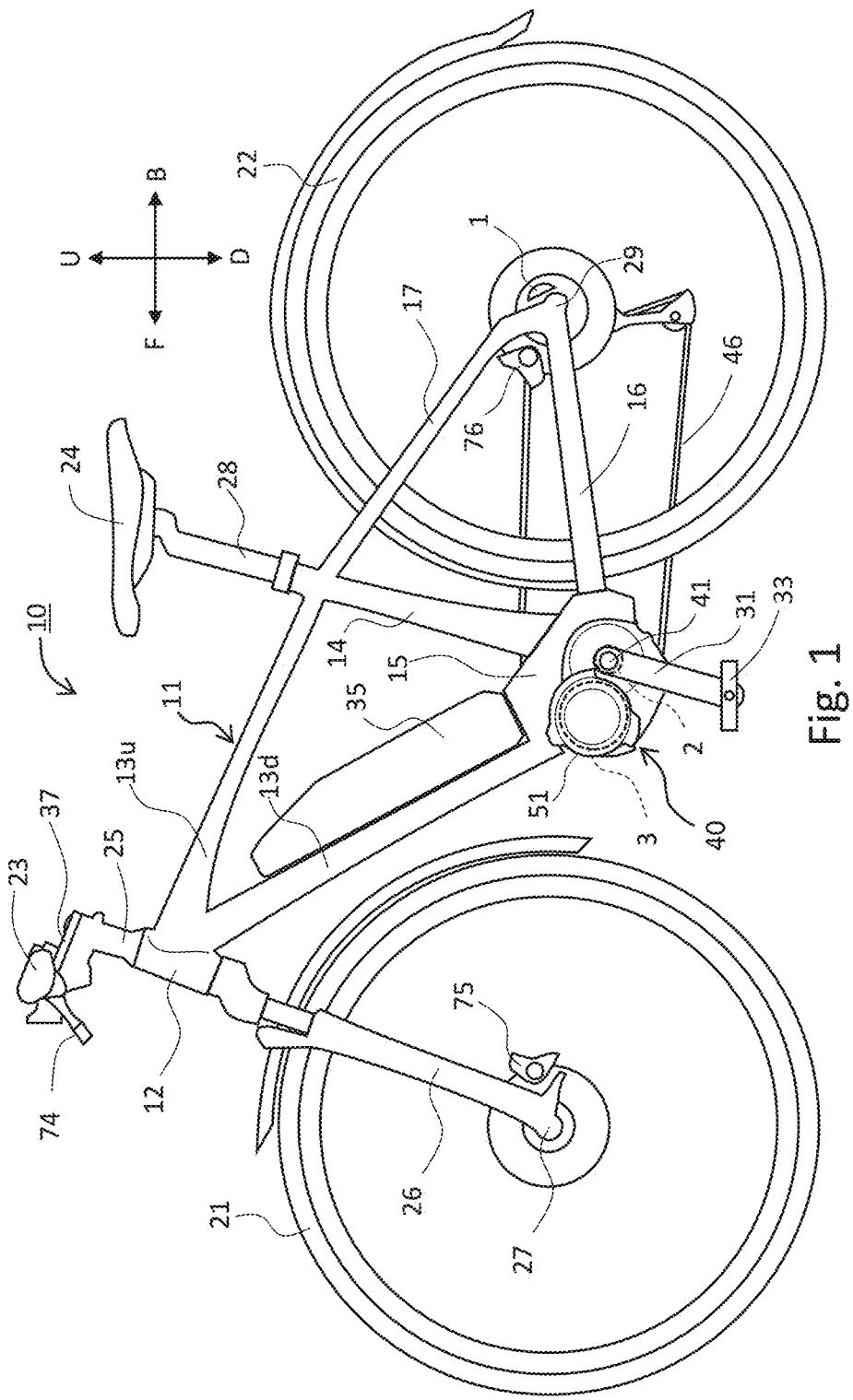
FIG. 1 is a left side view of an electric motor-assisted bicycle according to a preferred embodiment of the present invention.

The inventors of the preferred embodiments of the present invention conducted extensive research to determine a way to detect an unauthorized alteration to the motor control system in an electric motor-assisted bicycle, and with a simple configuration. Specifically, the inventors attempted to detect an unauthorized alteration using software to control the motor. During their research, they noted a tendency that, as the vehicle speed increases, the running output, i.e., the sum of the pedal force by the rider and the assist force by the motor, required to enable the electric motor-assisted bicycle to travel at that speed, increases. This tendency can help determine the level of the running output required for a vehicle speed detected by the vehicle speed sensor. If the actual level of running output is higher than the level of the running output required for the detected vehicle speed, it is highly likely that an alteration has been made. Thus, the inventors conceived that, in an electric motor-assisted bicycle, an unauthorized alteration determination threshold is determined depending on a vehicle speed detected, and this unauthorized alteration determination threshold is compared with the running output at the point of time at which that vehicle speed was detected to determine whether an unauthorized alteration has been made. Specifically, they arrived at the preferred embodiments of the present invention described below.

An electric motor-assisted bicycle according to a preferred embodiment of the present invention includes a vehicle speed sensor to detect a vehicle speed of the electric motor-assisted bicycle, a torque sensor to detect a pedal force on a pedal connected to a crankshaft of the electric motor-assisted bicycle, a motor to generate an assist force that assists the pedal force, a motor controller configured or programmed to control the assist force by the motor depending on the pedal force and the vehicle speed, a threshold determination unit configured or programmed to determine an unauthorized alteration determination threshold (referred to as "UA determination threshold") depending on the vehicle speed, and an unauthorized alteration detection unit (referred to as "UA detection unit") configured or programmed to determine whether an unauthorized alteration has been made to the vehicle speed sensor or the torque sensor by comparing a running output and the UA determination threshold, wherein the running output is a sum of the assist force by the motor and the pedal force. If the UA detection unit determines that an unauthorized alteration has been made, the apparatus performs a predetermined control to address the unauthorized alteration.

In the above-described preferred embodiment, the UA detection unit compares the UA determination threshold depending on the vehicle speed detected by the vehicle speed sensor, on the one hand, and the running output, on the other hand, which is the sum of the assist force by the motor and the pedal force. This enables a determination of whether the actual level of the running output at the point of time at which a vehicle speed was detected is far apart from the normal level for this vehicle speed. This enables detection of an unauthorized alteration. That is, information about vehicle speed, pedal force, and motor assist force that is regularly used to control the motor is utilized to enable detection of an unauthorized alteration. Thus, an unauthorized alteration to the motor control system is detected with a simple configuration.

The threshold determination unit may make a determination using pre-stored correspondence data that indicates the correspondence between vehicle speed and the UA determination threshold, for example. The correspondence data may be data such as a table or map that indicates the correspondence between vehicle speed and the UA determination threshold, for example. Alternatively, the correspondence data may be a function that indicates the relationship between vehicle speed and the UA determination threshold or a program to output a UA determination threshold corresponding to an input vehicle speed.

The relationship between vehicle speed and the UA determination threshold may indicate that the UA determination threshold increases as the vehicle speed increases for at least a portion of an entire expected vehicle speed range of the electric motor-assisted bicycle. For example, the UA determination threshold may monotonically increase as the vehicle speed increases. In some exemplary implementations, the UA determination threshold may be expressed as a linear function of vehicle speed. Alternatively, the UA determination threshold may be expressed as a quadratic or cubic curve of vehicle speed.

The running output of a non-altered vehicle (i.e., vehicle in a normal state) tends to increase as the vehicle speed increases. For example, a value higher than the running output level of a non-altered vehicle, which varies depending on vehicle speed, may be used as the UA determination threshold. The amount of increase from the running output level of a non-altered vehicle to a UA determination threshold may be determined based on amounts by which the output level of a non-altered vehicle can increase due to various conditions, for example.

The vehicle speed sensor may detect the velocity of the electric motor-assisted bicycle as measured in the direction of travel. The vehicle speed sensor may detect vehicle speed by detecting the rotation of a rotating body that rotates as the electric motor-assisted bicycle travels (for example, a wheel, a crankshaft or a transmission part), for example.

One example of an unauthorized alteration that is able to be detected by the UA detection unit is a manipulation of at least one of the values of pedal force and vehicle speed used to control the motor controller. For example, the UA detection unit is able to detect an unauthorized alteration such as a change in the attachment position or configuration of the vehicle speed sensor or torque sensor, or an addition of a device that manipulates the value of vehicle speed or torque supplied to the motor controller.

The UA detection unit may determine whether an unauthorized alteration has been made based on a result of the comparison between the running output and the UA determination threshold under a condition that the vehicle speed is constant. By using the running output for a constant vehicle speed to make a determination, false detection is reduced, enabling more accurate determination of whether an unauthorized alteration has been made.

The UA detection unit may determine that the vehicle speed is constant if the amount of fluctuation of vehicle speed or acceleration detected within a predetermined period of time is within a predetermined range, for example. In alternative implementations, the UA detection unit may determine whether an unauthorized alteration has been made by comparing the running output and the UA determination threshold under the condition that the acceleration of the electric motor-assisted bicycle in the direction of travel, i.e., front-rear direction, is constant. "Condition that the acceleration is constant" includes an acceleration of zero. In other implementations, the comparison to detect an unauthorized alteration may be done if, in addition to the acceleration in the front-rear direction, accelerations in other directions, such as top-bottom direction or left-right direction (i.e., vehicle-width direction), meet predetermined conditions.

The UA detection unit may determine whether an unauthorized alteration has been made based on a result of the comparison between the running output and the UA determination threshold under a condition that the vehicle speed is constant and the electric motor-assisted bicycle is determined to be travelling on a flat road. By making a determination using the running output for the electric motor-assisted bicycle travelling at a constant vehicle speed on a flat road, false detection is reduced, enabling even more accurate determination of whether an unauthorized alteration has been made.

A determination of whether the electric motor-assisted bicycle is travelling on a flat road may be made based on at least the acceleration in the top-bottom direction of the electric bicycle detected by an acceleration sensor provided in the electric bicycle, for example. In addition to the acceleration sensor, such a determination may be made using information detected by a gyro sensor (i.e., angular velocity sensor), for example.

The UA detection unit may determine whether an unauthorized alteration has been made based on a result of the comparison between the running output and the UA determination threshold when at least one of the vehicle speed and an acceleration in a direction of travel of the electric motor-assisted bicycle meets a predetermined condition. By making a determination using the running output when at least one of the vehicle speed and the acceleration in the direction of travel meets a predetermined condition, false detection is reduced, enabling a more accurate determination of whether an unauthorized alteration has been made.

Implementations where the UA detection unit determines whether an unauthorized alteration has been made by comparing the running output and the UA determination threshold under a predetermined condition such as a vehicle speed or acceleration include, for example, implementations where comparison is made under a predetermined condition or, if the predetermined condition is not met, comparison is not made. Alternatively, other possible implementations include implementations where the result of the comparison when the predetermined condition is not met is not used to determine whether an unauthorized alteration has been made. Other possible implementations include implementations where the result of the comparison when the predetermined condition is not met is reduced in weight relative to the result of the comparison under the predetermined condition before being used for determination.

The UA detection unit may determine whether an unauthorized alteration has been made by cyclically acquiring the running output and the UA determination threshold a plurality of times and comparing the running output and the UA determination threshold a plurality of times. By making a determination based on the result of a plurality of comparisons, false detection is reduced, enabling an even more accurate determination of whether an unauthorized alteration has been made.

The UA detection unit may change a cycle in which the running output and the UA determination threshold are acquired depending on a number of rotations of the crankshaft. This makes it possible to determine the running output and determine a UA determination threshold in a cycle suitable for the number of rotations of the crankshaft. The cycle in which a running output and a UA determination threshold are acquired and the cycle in which a running output is compared with a UA determination threshold may be the same, or may be different. The cycle in which a running output is acquired and the cycle in which a UA determination threshold is acquired may be the same, or may be different.

For example, the UA detection unit may determine the running output for each cycle based on at least one value representative of each of the pedal force and the motor assist force (for example, average) for the cycle. This makes it possible to acquire a running output with reduced influence of variations in the pedal force or the assist force for cycles of crankshaft rotation.

The UA detection unit may determine that an unauthorized alteration has been made if a time in which the running output is above the UA determination threshold is longer than a time in which assist force is generated without the running output being above the UA determination threshold. This reduces false detection, enabling an even more accurate determination of whether an unauthorized alteration has been made.

The UA detection unit may calculate for each of the plurality of comparisons, a value indicating a degree of likelihood of an unauthorized alteration based on a result of the comparison, and determine that an unauthorized alteration has been made if, for the plurality of comparisons, a cumulative value indicating the degree of likelihood of an unauthorized alteration exceeds a permissible range. This reduces false detection, enabling an even more accurate determination of whether an unauthorized alteration has been made.

The electric motor-assisted bicycle may further include a power switch to control a power supply to the motor between on and off, and a memory to store data. In this preferred embodiment, the UA detection unit may store, in the memory, the cumulative value indicating the degree of likelihood of an unauthorized alteration. The cumulative value indicating the degree of likelihood of an unauthorized alteration stored in the memory may be kept even when the power switch is turned off. This enables maintaining a cumulative value indicating the degree of likelihood of an unauthorized alteration even when the power switch is turned off. Since this enables accumulation of values indicating the degree of likelihood of an unauthorized alteration over periods of time separated by intervals with the power switch being off, false detection is even less likely. It will be understood that the power switch may switch between on and off in response to the rider's operation. In lieu of the rider's operation or in addition to the rider's operation, the power switch may be automatically turned on and off depending on the state of the vehicle (for example, whether the crankshaft is rotating or not).

The UA detection unit may calculate, for each of the plurality of comparisons between the running output and the UA determination threshold, the value indicating the degree of likelihood of an unauthorized alteration based on the result of the comparison, where the value is weighted based on at least one of the vehicle speed and the running output. This reduces false detection, enabling an even more accurate determination of whether an unauthorized alteration has been made.

The UA detection unit may detect the unauthorized alteration based on a result of the comparison between the running output and the UA determination threshold obtained when the vehicle speed is within a predetermined target range. This improves process efficiency. For example, out of the entire expected vehicle speed range of the electric motor-assisted bicycle, a low speed range, including the vehicle speed of zero, may be ignored, i.e., the result of the comparison for a low speed range may not be used for determination about an unauthorized alteration. This enables a determination using the result of the comparison for a vehicle speed range in which unauthorized alteration is easily detected.

The threshold determination unit may determine the UA determination threshold such that the UA determination threshold increases as the vehicle speed increases for at least a portion of an entire expected vehicle speed range of the electric motor-assisted bicycle. This makes it possible to determine a threshold taking into account a tendency that the running output increases with increased vehicle speed. This reduces false detection, enabling a more accurate determination of whether an unauthorized alteration has been made.

If the UA detection unit determines that an unauthorized alteration has been made, the motor controller may control the assist force by the motor in a mode responsive to detection of an unauthorized alteration (hereinafter referred to as "UA_Detected mode"). Thus, the manner in which the assist force is supplied by the motor when an unauthorized alteration has been detected is different from the manner used when no unauthorized alteration has been detected.

In the UA_Detected mode, the motor controller restricts the assist force by the motor relative to the pedal force as compared with a situation not in the UA_Detected mode (for example, when the motor is operated in the normal mode). For example, in the UA_Detected mode, the motor controller may stop the motor output, or may lower the upper limit for the assist force by the motor relative to a situation not in the UA_Detected mode. Further, the motor controller may automatically disable the UA_Detected mode after a predetermined period of time. Alternatively, the motor controller may disable the UA_Detected mode when the UA detection unit determines that no unauthorized alteration has been made by comparing the running output with the UA determination threshold.

A motor control apparatus for the above-described electric motor-assisted bicycle controls a motor generating assist force that assists a pedal force on a pedal of an electric motor-assisted bicycle. The motor control apparatus includes a motor controller configured or programmed to control the assist force by the motor depending on the pedal force and a vehicle speed, in which a torque sensor detects the pedal force on the pedal and a vehicle speed sensor detects the vehicle speed of the electric motor-assisted bicycle; a threshold determination unit configured or programmed to determine a UA determination threshold depending on the vehicle speed; and a UA detection unit to detect an unauthorized alteration to the vehicle speed sensor or the torque sensor by comparing a running output and the UA determination threshold determined by the threshold determination unit, wherein the running output is a sum of the assist force by the motor and the pedal force. If the UA detection unit determines that an unauthorized alteration has been made, the motor control apparatus performs a predetermined control to address the unauthorized alteration.

Now, electric motor-assisted bicycles according to preferred embodiments of the present invention will be described with reference to the drawings. Throughout the drawings, the same or corresponding components are labeled with the same reference characters, and their description will not be repeated. The sizes of the components in the drawings do not exactly represent the sizes of the actual components, size ratios between the components, etc. In the following description, the directions "front/forward", "rear(ward)", "left", "right", "up(ward)/top", and "down(ward)/bottom" of the electric motor-assisted bicycle mean such directions as perceived by a rider sitting on the saddle (i.e., seat 24) and gripping the handlebars 23. The directions "front/forward", "rear(ward)", "left", "right", "up (ward)/top", and "down(ward)/bottom" of the electric motor-assisted bicycle are the same as such directions of the vehicle body frame of the electric motor-assisted bicycle. Further, the direction of travel of the electric motor-assisted bicycle is the same as the front-rear direction of the electric motor-assisted bicycle. The preferred embodiments described below are merely exemplary, and the present invention is not limited to the preferred embodiments described below.

FIG. 1 is a left side view of an electric motor-assisted bicycle 10 according to a preferred embodiment of the present invention. The characters F, B, U and D in FIG. 1 indicate forward, rearward, upward and downward, respectively.

As shown in FIG. 1, the electric motor-assisted bicycle 10 includes a vehicle body frame 11. The vehicle body frame 11 extends in the front-rear direction. The vehicle body frame 11 includes a head pipe 12, an upper frame portion 13u, a down frame portion 13d, a seat frame portion 14, a pair of chain stays 16, and a pair of seat stays 17. The head pipe 12 is located toward the front with respect to the electric motor-assisted bicycle 10. The front ends of the down and upper frame portions 13d and 13u are connected to the head pipe 12. The down and upper frame portions 13d and 13u extend in the front-rear direction. The down and upper frame portions 13d and 13u extend obliquely downward. The upper frame portion 13u is located higher than the downward frame portion 13d. The rear end of the upper frame portion 13u is connected to the seat frame portion 14. The rear end of the down frame portion 13d is connected to a bracket 15. The lower end of the seat frame portion 14 is connected to the bracket 15. The seat frame portion 14 extends upward and obliquely rearward from the bracket 15. It will be understood that the vehicle body frame 11 may not include the upper frame portion 13u.

A handle stem 25 is inserted into the head pipe 12 so as to be rotatable. The handlebars 23 are fixed to the upper end of the handle stem 25. A front fork 26 is fixed to the lower end of the handle stem 25. A front wheel 21 is rotatably supported on the lower end of the front fork 26 by an axle 27.

A grip is attached to each of the left and right ends of the handlebars. A left brake lever 74 is attached to a location on the handlebars 23 toward the left, whereas a right brake lever 74 is attached to a location on the handlebars 23 toward the right. The left brake lever 74 operates a brake 76 for the rear wheel 22. The right brake lever 74 operates a brake 75 for the front wheel 21.

A seat pipe 28 is inserted into the cylindrical seat frame portion 14. A seat 24 is provided on the upper end of the seat pipe 28. Thus, the vehicle body frame 11 rotatably supports the handle stem 25 at its front, and rotatably supports the rear wheel 22 at its rear. Further, the seat 24 and a drive unit 40 are attached to the vehicle body frame 11.

The pair of chain stays 16 are connected to the rear end of the bracket 15. The pair of chain stays 16 sandwich the rear wheel 22 from the left and right. One end of each of the seat stays 17 is connected to the rear end of the associated one of the chain stays 16. The pair of seat stays 17 sandwich the rear wheel 22 from the left and right. The other end of each of the seat stays 17 is connected to a location on the seat frame portion 14 toward its top. The rear wheel 22 is rotatably supported on the rear ends of the pair of chain stays 16 by the axle 29.

A vehicle speed sensor (or speed sensor) 1 to detect the rotation of the rear wheel 22 is provided on the rear ends of the chain stays 16. The vehicle wheel sensor 1 includes, for example, a detected element that rotates together with the rear wheel 22, and a detecting element fixed to the vehicle body frame 11 to detect the rotation of the detected element. The detecting element detects the detected element in a mechanical, magnetic or optical manner. The vehicle speed sensor 1 may detect the rotation of a rotating body other than the rear wheel 22 that rotates together with the advance of the electric motor-assisted bicycle 10, such as the front wheel 21, motor 3, crankshaft 41, transmission gear, or chain.

A drive unit 40 is attached to the lower edge of the bracket 15 by fasteners (not shown). The drive unit 40 includes a housing 51 forming the exterior of the drive unit 40. A motor 3 is contained in the housing 51. A crankshaft 41 extends through the housing 51 in the left-right direction. The crankshaft 41 is rotatably supported on the housing 51 by a plurality of bearings.

A torque sensor 2 is provided around the crankshaft 41 to detect a pedal force applied by the rider. The torque sensor 2 detects torque that rotates the crankshaft 41 about its axis. The torque sensor 2 may include, for example, a non-contact torque sensor such as a magnetostrictive sensor, or a contact torque sensor such as an elastic-body variable detection-type sensor. A magnetostrictive torque sensor includes a magnetostrictive member that has magnetostrictive effects and receives rotational forces of the crankshaft, and a detection coil that detects changes in magnetic permeability caused by forces of the magnetostrictive member.

Crank arms 31 are attached to the respective ends of the crankshaft 41. Pedals 33 are attached to the distal ends of the respective crank arms 31. The crankshaft 41 is rotated by the rider pressing the pedals 33. Although not shown, the electric motor-assisted bicycle 10 is provided with a driving sprocket that rotates together with the crankshaft 41 and a driven sprocket that rotates together with the rear wheel 22. A chain 46 is wound around the driving and driven sprockets to connect them. The chain 46 may be replaced by a belt, a shaft or the like. A one-way clutch (not shown) is provided in the path of transmission of rotation from the crankshaft 41 to the driving sprocket. The one-way clutch transmits forward rotation, and does not transmit rearward rotation.

A transmission mechanism (not shown) is provided within the drive unit 40 to transmit the rotation of the motor 3 to the driving sprocket (or chain 46). The transmission mechanism includes, for example, a plurality of reduction gears. The reduction gears reduce the rotational speed of the motor before the rotation is transmitted to the driving sprocket. Further, the transmission mechanism includes a synthesizing mechanism that synthesizes the rotation of the crankshaft 41 and the rotation of the motor 3 before transmitting the resulting rotation to the driving sprocket. The synthesizing mechanism includes a cylindrical member, for example. The crankshaft 41 is located within the cylindrical member. The driving sprocket is attached to the synthesizing mechanism. The synthesizing mechanism rotates about the same axis of rotation as the crankshaft 41 and driving sprocket. A one-way clutch (not shown) may be provided in the path of transmission of rotation from the crankshaft 41 to the synthesizing mechanism and the path of transmission of rotation from the motor 3 to the synthesizing mechanism. The one-way clutch transmits forward rotation, and does not transmit rearward rotation. The rotational force transmitted from the motor 3 to the driving sprocket via the transmission mechanism defines the assist force by the motor 3.

The driving sprocket and an auxiliary sprocket transmit a driving force to the rear wheel 22 via the chain 46. Specifically, a pedal force generated by the rider pressing the pedals 33 rotates the driving sprocket in the forward direction, and is transmitted, via the chain 46, as a driving force that rotates the rear wheel 22 in the forward direction. Further, a rotational force generated by operation of the motor 3 rotates the crankshaft 41 in the forward direction. Thus, the rotational force output by the motor 3 assists the pedal force generated by the rider pedaling the pedals 33.

The transmission of the assist force generated by the motor is not limited to the above-described exemplary mechanism. For example, the drive unit 40 may include an output shaft that extends outward from within the housing 51 in the left-right direction. In such implementations, the rotation of the motor 3 is transmitted to the output shaft via the transmission mechanism. Outside the housing 51, the auxiliary sprocket is attached to the output shaft. The chain 46 is wound around the auxiliary sprocket. The rotational force generated by operation of the motor 3 rotates the auxiliary sprocket and, via the chain 46, rotates the rear wheel 22 in the forward direction.

The drive unit 40 includes a motor control apparatus to control the motor 3. For example, an electronic device mounted on a board within the housing 51 of the drive unit 40 may define and function as the motor control apparatus. The electronic device includes, for example, a processor or an electronic circuit. The motor control apparatus is electrically connected to the vehicle speed sensor 1, torque sensor 2 and motor 3. This connection may use a cable, or may be wireless.

A battery unit 35 is positioned on the down frame portion 13d. The battery unit 35 supplies the motor 3 of the drive unit 40 with electric power. The battery unit 35 includes a battery and a battery control unit, not shown. The battery is a chargeable battery capable of being charged and discharged. The battery control unit controls the charging and discharging of the battery and, at the same time, monitors output current, remaining capacity, and other information about the battery. It will be understood that the battery unit 35 may be positioned on the seat frame portion 14 or upper frame portion 13*u*.

The handlebars 23 are provided with a display device 37. The display device 37 includes, for example, a display and buttons for receiving user operations, or an input unit such as a touch screen. The display device 37 displays various information relating to the electric motor-assisted bicycle 10. It will be understood that the display device 37 may be omitted.

Although not shown, the electric motor-assisted bicycle 10 may include a crankshaft rotation sensor to detect the rotation of the crankshaft 41. The crankshaft rotation sensor may include, for example, a detected element that rotates together with the crankshaft 41, and a detecting element fixed to the vehicle body frame 11 to detect the rotation of the detected element. The detecting element is able to detect the detected element in a mechanical, optical or magnetic manner.

Although not shown, the electric motor-assisted bicycle 10 may include a gearshift. The gearshift is a mechanism that changes the gear ratio in response to an operation of a gear operation device by the rider. The gearshift operation device may be provided on the handlebars 23, for example. The gearshift may include, for example, at least one of the driving sprocket and driven sprocket as a multi-stage sprocket. The multi-stage sprocket, around which the chain 46 is wound, is switched in response to a user operation of the gearshift operation device. The gearshift may be an externally attached gearshift, or may be an internally incorporated gearshift.

Figure 2:
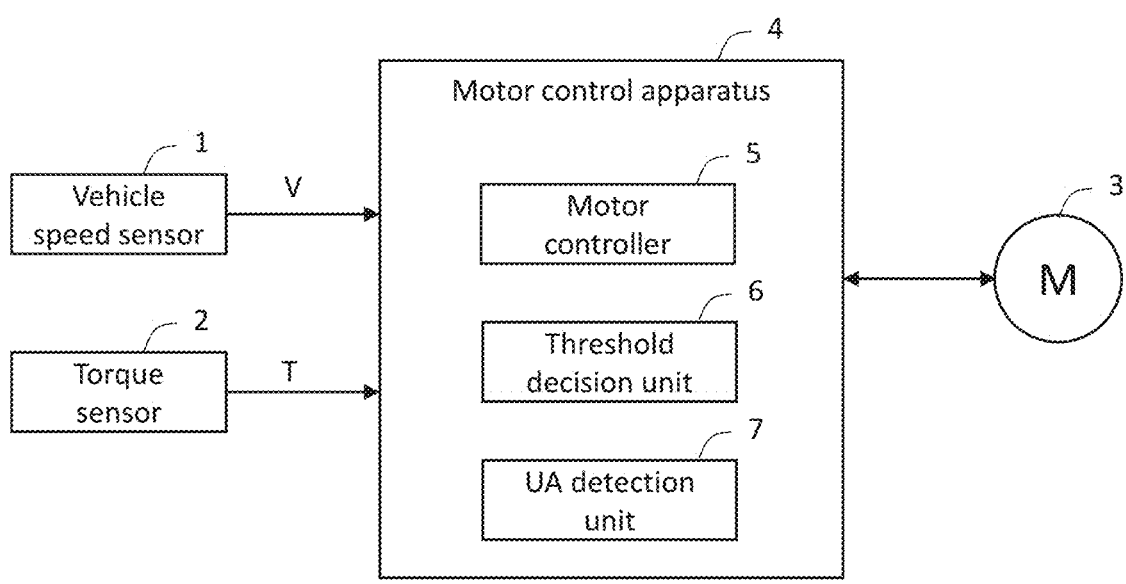
FIG. 2 shows an exemplary configuration of the motor control apparatus 4 according to a preferred embodiment of the present invention.

FIG. 2 shows an exemplary configuration of the motor control apparatus 4. In the implementation shown in FIG. 2, the motor control apparatus 4 includes a motor controller (i.e., motor control unit) 5, a threshold determination unit 6, and a UA detection unit 7. The motor controller 5 controls the assist force by the motor 3 depending on the pedal force T detected by the torque sensor 2 and on the vehicle speed V detected by the vehicle speed sensor 1. The threshold determination unit 6 determines a UA determination threshold depending on the vehicle speed V. The UA detection unit 7 compares the running output, which is the sum of the assist force by the motor 3 and the pedal force T, on the one hand, and the UA determination threshold determined by the threshold determination unit 6. Based on the result of the comparison, the UA detection unit 7 determines whether there has been an unauthorized alteration. If the UA detection unit 7 determines that there has been an unauthorized alteration, the electric motor-assisted bicycle 10 performs a predetermined control to address the unauthorized alteration.

By way of example, the motor control apparatus 4 may be a motor control unit (MCU). The motor control apparatus 4 includes, for example, a processor, memory, a motor drive circuit, and a motor monitoring unit. The processor executes a program in the memory to perform the functions of the motor controller 5, the threshold determination unit 6, and the UA detection unit 7. It will be understood that at least some of the functions of the motor controller 5, the threshold determination unit 6 and the UA detection unit 7 may be performed by a circuit other than a processor.

To perform the functions of the motor controller 5, the processor receives input about the vehicle speed V and the pedal force T and outputs control signals for the motor 3. The motor drive circuit operates in accordance with the control signals to drive the motor 3. The motor drive circuit may be an inverter, for example. The battery unit 35 supplies the motor 3 with an amount of electric power that corresponds to a control signal from the processor. The motor 3, when supplied with electric power, rotates and generates the assist force as controlled by the motor controller 5.

A motor monitoring unit acquires values relating to the drive of the motor 3, such as electric current and voltage in the motor 3, as well as the number of rotations and rotation speed of the motor. The processor or motor drive circuit may use values acquired by the motor monitoring unit to execute a process or operation.

The vehicle speed sensor 1 detects the rotational angle of the rear wheel 22 (or another rotating body) and provides, as output, a signal corresponding to the rotational angle to the motor control apparatus 4. For example, the vehicle speed sensor 1 detects the rotation of the rear wheel 22 at intervals of a predetermined angle and outputs a rectangular wave signal or a sine wave signal. The processor calculates the rotational speed of the rear wheel 22 from the output signal of the vehicle speed sensor 1. In some implementations, the calculation of the rotational speed may be performed by the vehicle speed sensor 1.

The torque sensor 2 outputs a voltage signal with an amplitude corresponding to the magnitude of the detected torque. The torque sensor 2 may include a torque calculation circuit that converts a voltage signal to a torque value. The torque calculation circuit may convert an output analog voltage signal to a digital value through AD conversion, for example. The magnitude of the detected torque is output as a digital signal. In some implementations, the motor control apparatus 4 may receive an analog signal from the torque sensor 2 and convert it to a digital value.

Figure 3:
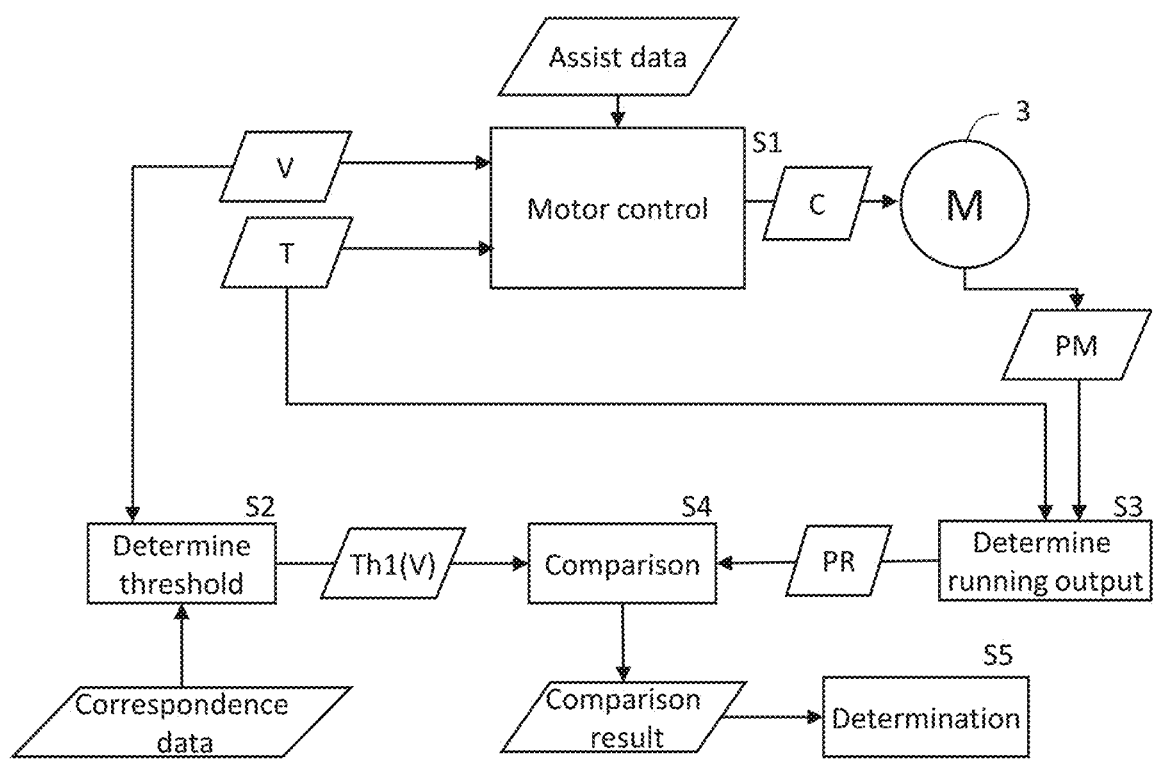
FIG. 3 shows an exemplary process by the motor control apparatus shown in FIG. 2, and an exemplary flow of data.

FIG. 3 shows an exemplary process performed by the motor controller 5, the threshold determination unit 6 and the UA detection unit 7 shown in FIG. 2, and an exemplary flow of data (i.e., signals).

In the implementation shown in FIG. 3, depending on vehicle speed and pedal force as well as assist data indicating the correspondence between these parameters and motor command value, the motor controller 5 may determine a command value depending on the vehicle speed V and the pedal force T that have been input (S1). The assist data is stored in memory in advance. The assist data may be a map, a table, a function or other programs. By way of example, the motor controller 5 may control the motor assist force such that the ratio of the motor assist force to the pedal force T, hereinafter referred to as assist ratio, varies depending on the vehicle speed V. This will enable, for example, a control that limits the assist ratio for the highest range within the entire vehicle speed range expected for the electric motor-assisted bicycle, referred to as high speed range.

The threshold determination unit 6 determines a UA determination threshold depending on the vehicle speed V detected by the vehicle speed sensor 1 (S2). The threshold determination unit 6 uses correspondence data that indicates the correspondence between vehicle speed and the UA determination threshold to determine the UA determination threshold corresponding to the vehicle speed V. The correspondence data is stored in memory in advance.

The UA detection unit 7 determines the running output PR based on the pedal force T detected by the torque sensor 2 and the assist force PM by the motor 3 acquired by the motor monitoring unit (S3). The running output PR may be, for example, the sum of the values of the assist force PM by the motor 3 and the pedal force T detected by the torque sensor 2 (PR=PM+T). Although not limiting, by way of example, the assist force PM by the motor 3 may be calculated based on the command value for the motor 3 and the number of rotations of the motor. The assist force PM by the motor 3 may be, for example, a motor output value. The running output PR may be any value that indicates the total amount of the assist force PM by the motor 3 and the pedal force T. The calculation of the running output is not limited to any specific method. For example, a value indicating the assist force PM by the motor 3 may be calculated based on at least one of the current and voltage of the motor 3. Alternatively, the sum of the work of the assist force PM by the motor 3 and the work of the pedal force T may be treated as the running output PR.

The UA detection unit 7 may use, as the value indicating the assist force PM by the motor 3 and the value indicating the pedal force T used to calculate the running output PR, a value obtained by removing the variations for cycles with a smaller length than the cycle in which the crankshaft 41 is rotated. For example, the UA detection unit 7 may obtain a running output PR in a set cycle. In such implementations, a value representative of the pedal force T and a value representative of the assist force PM by the motor 3 for each cycle (for example, average or mean value) may be used to calculate the running output PR for each cycle. For example, the values of the moving average of the pedal force T and the moving average of the assist force PM by the motor 3 for each cycle may be used to calculate the running output PR for this particular cycle. Alternatively, at least one of the pedal force T and the assist force PM by the motor 3 may be a value that has been processed by a low-pass filter. Alternatively, the UA detection unit 7 may calculate the moving average of the running output for each cycle and treat it as the running output PR for this particular cycle. The cycle in which a running output is acquired may vary depending on the number of rotations of the crankshaft 41 or the cycle in which the crankshaft is rotated, for example.

The UA detection unit 7 compares the UA determination threshold Th1 determined in step S2, on the one hand, and the running output PR determined at step S3, on the other hand, and stores the result of the comparison in the memory (S4). Based on the result of the comparison, the UA detection unit 7 determines whether there has been an unauthorized alteration (S5). The result of the comparison may be used as a value indicating the degree of likelihood of an unauthorized alteration. By way of example, if the running output PR exceeds the UA determination threshold Th1 (PR>Th1), the unit may perform an addition to the value indicating the degree of likelihood in the memory; if the running output does not exceed the UA determination threshold Th1 (PR<Th1), the unit may perform a subtraction from the value indicating the degree of likelihood. It may be determined in advance whether an addition or a subtraction is performed if PR=Th1. In this way, the value in the memory is updated in such a manner that the degree of likelihood increases if PR>Th1. Thus, if the value indicating the degree of likelihood in the memory exceeds a permissible range, the UA detection unit 7 is able to determine that there has been an unauthorized alteration.

The UA detection unit 7 may weight the value indicating the result of the comparison based on at least one of the vehicle speed V and running output PR before storing it in the memory. For example, the weighting may depend on the amount by which the running output PR exceeds the UA determination threshold. Further, the weighting may depend on the vehicle speed range to which the current vehicle speed V belongs. For example, the weighting may be such that the degree of likelihood is higher if the vehicle speed falls within a vehicle speed range in which the increase in the running output relative to the vehicle speed due to an unauthorized alteration is significant. For example, the result of the comparison may be weighted such that the amount added to the value of the degree of likelihood for PR>Th1 if the vehicle speed falls within a certain predetermined vehicle speed range is larger than the amount added for PR>Th1 if the vehicle speed is outside that certain vehicle speed range. This will improve the accuracy of determination about an unauthorized alteration.

The data stored in the memory is kept even when the power switch to control power supply to the motor 3 between on and off is turned off. Further, the data in the memory is kept even when the battery unit 35 is removed from the electric motor-assisted bicycle 10 so that there is no power supply from the battery unit 35 to the motor control apparatus 4. Thus, the value indicating the degree of likelihood of an unauthorized alteration in the memory is kept even when the power supply is disrupted. It will be understood that the memory may be a non-volatile memory, for example.

The process denoted by S2 to S4 shown in FIG. 3 is repeated a plurality of times with a set cycle. In each of the plurality of rounds of the comparison step (S4), the result of the comparison in the memory is updated. That is, the result of a plurality of comparisons is stored in the memory. The UA detection unit 7 determines whether there has been an unauthorized alteration based on information in the memory that reflects the result of a plurality of rounds of the comparison step.

Figure 4:
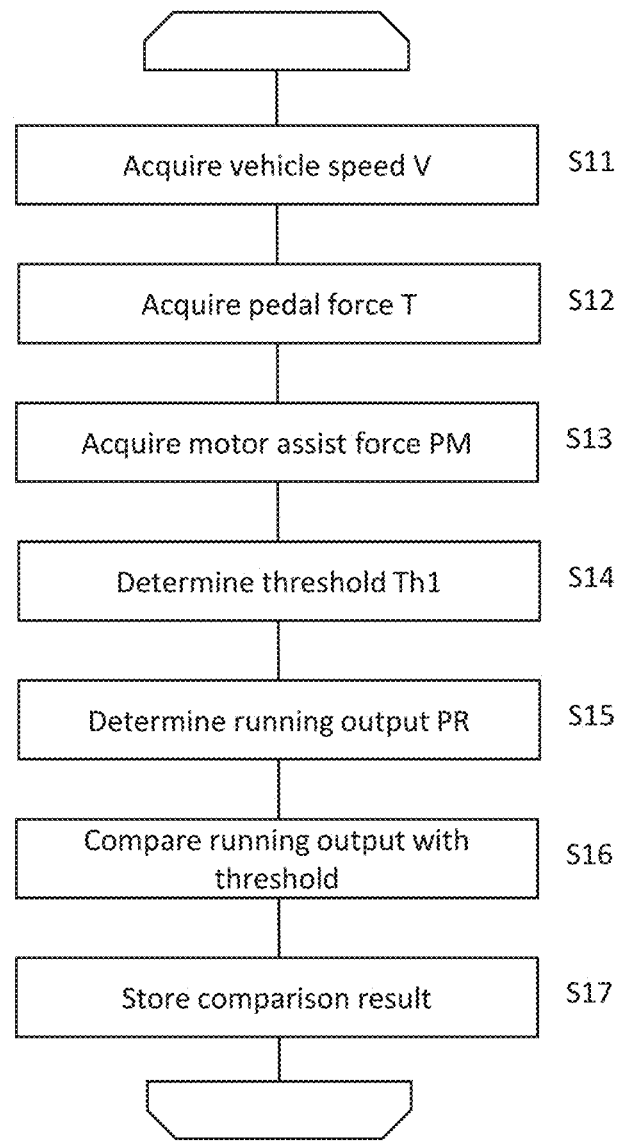
FIG. 4 is a flow chart showing an exemplary process denoted by S2 to S4 shown in FIG. 3.

FIG. 4 is a flow chart showing an exemplary process denoted by S2 to S4 shown in FIG. 3. In the implementation shown in FIG. 4, the threshold determination unit 6 acquires a vehicle speed V detected by the vehicle speed sensor 1 (S11). The UA detection unit 7 acquires a pedal force T detected by the torque sensor 2 (S12). The UA detection unit 7 acquires an assist force PM by the motor 3 (S13). The order of acquisition steps S11 and S13 is not limited to any particular one. Acquisition steps S11 to S13 are performed in a synchronized manner relative to one another. That is, the vehicle speed V, the pedal force T, and the assist force PM by the motor 3 detected generally at the same time are acquired. In other words, the pedal force T and the assist force PM by the motor 3 at the time of detection of the vehicle speed V are acquired. At least one of the vehicle speed V, the pedal force T, and the assist force PM by the motor 3 may be a moving average.

The threshold determination unit 6 determines a UA determination threshold Th1 depending on the vehicle speed V acquired at step S11 (S14). The UA detection unit 7 determines the running output PR based on the pedal force T acquired at step S12 and the assist force PM by the motor 3 acquired at step S13 (S15). By way of example, the running output PR may be T+PM. It will be understood that the running output PR determined at step S15 may be a moving average.

The UA detection unit 7 compares the UA determination threshold Th1 determined at step S14, on one hand, and the running output PR determined at step S15 (S16). The UA detection unit 7 stores the result of the comparison in the memory (S17). By way of example, if Th1>PR, the unit adds "−1" to the value indicating the degree of likelihood of an unauthorized alteration; if Th1 PR, the unit adds "+1" to the value indicating the degree of likelihood. This process denoted by S11 to S17 is repeated with a set cycle. Alternatively, "−1" may be added to the value if Th1≥PR, whereas "+1" may be added if Th1<PR.

In some implementations, the UA detection unit 7 may not perform the process denoted by S14 to S17 if at least one of the vehicle speed V acquired at step S11 and the assist force PM by the motor 3 acquired at step S13 is zero. In such implementations, advantageously the comparison process is not performed when the electric motor-assisted bicycle 10 is not travelling or if there is no assist by the motor 3.

Figure 5:
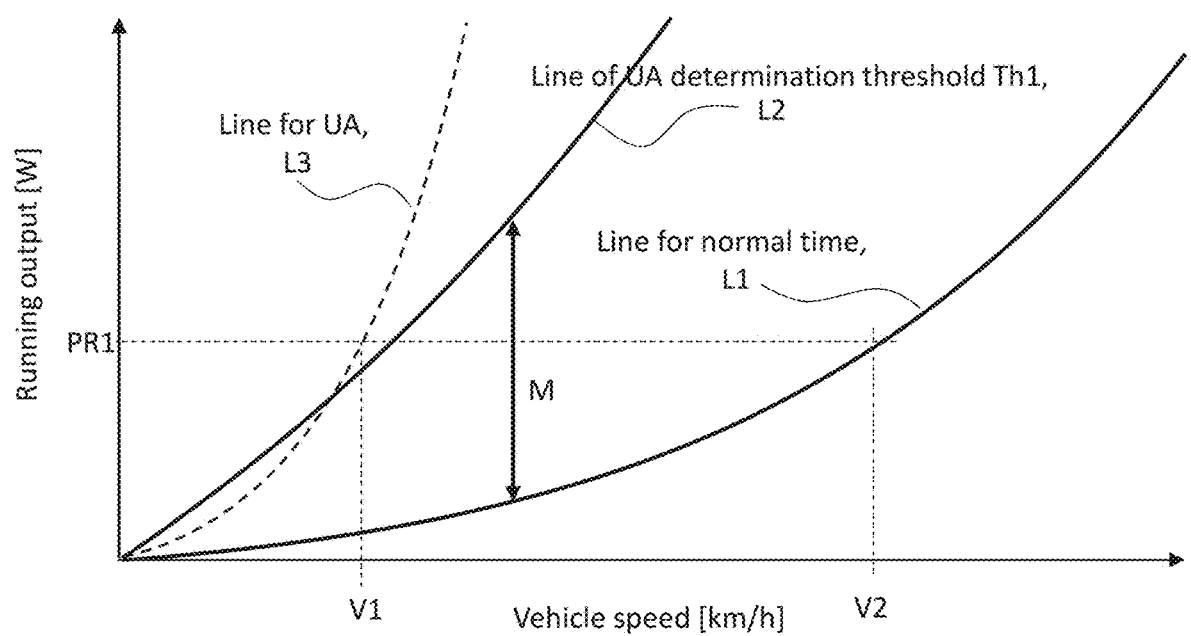
FIG. 5 is a graph showing an exemplary correspondence between vehicle speed and a UA determination threshold.

FIG. 5 is a graph showing an exemplary correspondence between vehicle speed and UA determination threshold indicated by the correspondence data in FIG. 3. The graph in FIG. 5 shows a line indicating the relationship between vehicle speed and the running output in a normal state (i.e., one with no unauthorized alterations), L1, and a line indicating the relationship between vehicle speed and UA determination threshold Th1, L2. The inventors discovered that, as indicated by line L1, in a normal state, there is a tendency that the higher the vehicle speed, the larger the running output. Line L1 shown in FIG. 5 indicates the relationship between vehicle speed and running output when the electric motor-assisted bicycle 10 is travelling on a flat road at a constant vehicle speed.

In the implementation shown in FIG. 5, line L2 for a running output at a higher level than normal-state line L1 is set as a representation of the UA determination threshold Th1. An unauthorized alteration is determined to be likely if the vehicle speed and running output fall within the region above line L2. Line L1 shown in FIG. 5 indicates an average-level relationship between vehicle speed and running output. An actual relationship between vehicle speed and running output in a normal state varies depending on various conditions at a given time. Thus, an actual relationship between vehicle speed and running output in a normal state may depart from average-level line L1 shown in FIG. 5. Thus, it is preferable that the amount of increase of the UA determination threshold Th1 (line L2) relative to the normal-state running output (line L1), M, is adjusted to be slightly larger than the amount by which the running output in a normal state can increase.

An amount of increase M can be determined taking into account factors contributing to increases in running output in a normal state. Factors contributing to increases that are to be considered include, for example, the total weight of the electric motor-assisted bicycle, headwind, errors in evenness (e.g., errors in attachment of the drive unit, or forward inclination due to sinking of the front suspension), suspension resistance (e.g., loss of viscosity), air pressures in the tires, tire shapes (e.g., block tire), off-road resistance, and errors in acceleration/deceleration. At least one of these factors may be considered in setting the amount of increase M of the UA determination threshold relative to the running output level in a normal state to set the UA determination threshold to a more appropriate level.

The inventors discovered that, as indicated by line L1 in FIG. 5, the running output is proportional to the vehicle speed to the power of 3. Suppose, for example, that an unauthorized alteration has been made to manipulate the vehicle speed detected by the vehicle speed sensor 1 so as to be lower than the actual level. If the vehicle speed detected is thus lower than the actual level, the running output dramatically rises as the vehicle speed detected increases. Line L3 shown in FIG. 5 indicates the relationship between the detected vehicle speed and running output if an unauthorized alteration has been made to manipulate the vehicle speed so as to be lower than the actual level. Line L1 for a normal state is changed to line L3, for example, by an unauthorized alteration. Thus, if the running output is abnormally high relative to the detected value of vehicle speed, the running output exceeds the UA determination threshold Th1 which is determined depending on the detected vehicle speed. This increases the value indicating the degree of likelihood of an unauthorized alteration in the memory. When the running output repeatedly exceeds the UA determination threshold Th1, it is determined that there has been an unauthorized alteration.

In the implementation shown in FIG. 5, as the vehicle speed increases, the UA determination threshold also increases. Line L2 is a monotone increasing function. Although line L2 is a cubic function, the relationship between the UA determination threshold and vehicle speed may be expressed as a linear function, or may be expressed as a quadratic function. Further, while the threshold tends to increase with increased vehicle speed throughout the entire vehicle speed range, there may be some vehicle speed range in which the threshold does not increase with increased vehicle speed.

As shown in FIG. 5, if the UA determination threshold Th1 rises as the vehicle speed detected by the vehicle speed sensor 1 increases, a comparison process to determine an unauthorized alteration is possible in a wide vehicle speed range. For example, if an unauthorized alteration has been made, then, at a certain vehicle speed V1, the running output PR1 exceeds the UA determination threshold Th1(V1) (PR1>Th1(V1)). In this case, the degree of likelihood of an unauthorized alteration is determined to be relatively high. For a vehicle speed V2 higher than the vehicle speed V1 (V2>V1), the same running output PR1 does not exceed the UA determination threshold Th1(V2) (PR1<Th1(V2)). In this case, the degree of likelihood of an unauthorized alteration is determined to be relatively low. Thus, an appropriate determination is possible for both speeds V1 and V2. On the contrary, if the UA determination threshold were constant regardless of vehicle speed, a correct determination for both different vehicle speeds V1 and V2 would not be possible.

Figure 6:
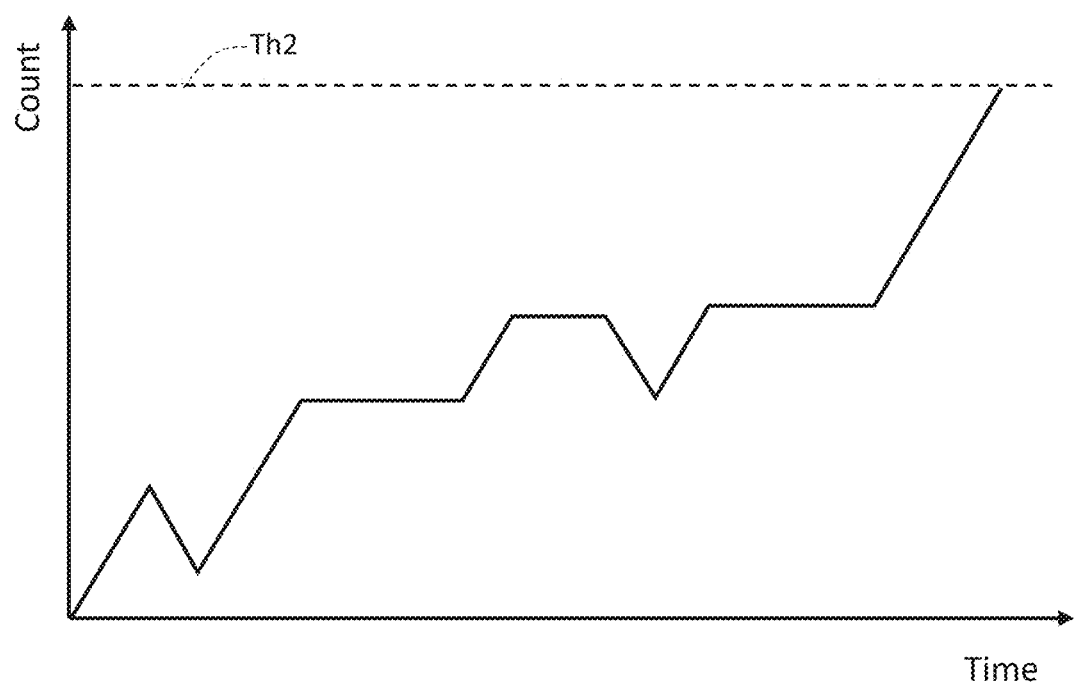
FIG. 6 is a graph showing exemplary results of comparison over time, stored in the memory in FIG. 3.

FIG. 6 is a graph showing exemplary results of comparison over time, stored in the memory, during the process shown in FIG. 3. In FIG. 6, the horizontal axis of the graph indicates time, while the vertical axis indicates the cumulative value indicating the degree of likelihood of an unauthorized alteration. In the implementation shown in FIG. 6, the value indicating the degree of likelihood increases in periods where the result of the comparison between running output PR and UA determination threshold Th1 shows PR>Th1, whereas the value indicating the degree of likelihood decreases in periods where PR<Th1. Periods where the value indicating the degree of likelihood remains unchanged are, for example, periods where the running output or vehicle speed is zero such that the comparison process is not performed. When the cumulative value indicating the degree of likelihood exceeds the threshold Th2, the UA detection unit 7 determines that there has been an unauthorized alteration. That is, an unauthorized alteration is detected. In this implementation, the UA detection unit 7 determines that there has been an unauthorized alteration if the time for which the running output PR is above the UA determination threshold Th1 is longer than the time for which assist force is being generated without the running output PR being above the UA determination threshold Th1.

In the present preferred embodiment, if an unauthorized alteration has been made such that a detection value from the vehicle speed sensor 1 becomes smaller than the actual level, the unauthorized alteration is detected if, for example, the vehicle continues to travel for a predetermined time at the detected vehicle speed V1 and with the running output PR1, as shown in FIG. 5. On the other hand, if no unauthorized alteration has been made, no unauthorized alteration is detected if the vehicle continues to travel for a predetermined time with the same running output PR1 but at the vehicle speed V2 which is higher than the vehicle speed V1 (V2>V1). Thus, a determination about an unauthorized alteration that is appropriate for the detected vehicle speed is possible.

Figure 7:
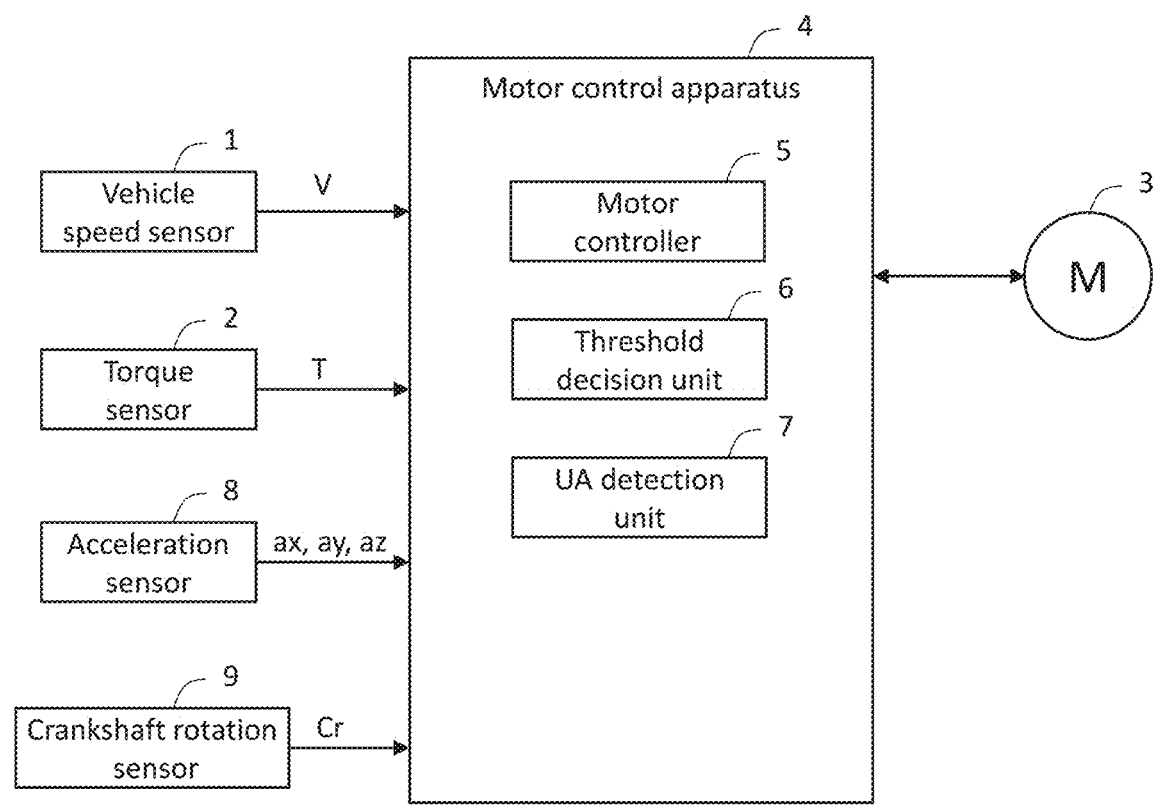
FIG. 7 shows a variation of the configuration of the motor control apparatus.

FIG. 7 shows a variation of the configuration of the motor control apparatus. In the implementation of FIG. 7, the motor control apparatus 4 acquires an acceleration detected by an acceleration sensor 8 provided in the electric motor-assisted bicycle 10 and a number of rotations of the crankshaft Cr detected by a crankshaft rotation sensor 9. The acceleration sensor 8 detects: the acceleration in the front-rear direction of the vehicle body frame 11, ax; the acceleration in the left-right direction, ay; and the acceleration in the top-bottom direction, az. At least one of these three accelerations in different directions can be used by the motor control apparatus 4. Thus, the motor control apparatus 4 may acquire information obtained by detection other than vehicle speed V and pedal force T to be used for processing.

The motor controller 5 may use the number of crankshaft rotations Cr, in addition to the vehicle speed V and pedal force T, to control the motor 3. The UA detection unit 7 may further use the acceleration and the number of crankshaft rotations Cr to determine whether there has been an unauthorized alteration. It will be understood that additional information that can be used by the motor control apparatus 4 is not limited to the examples shown in FIG. 7. For example, information such as gear ratio or angular velocities about axes in the front-rear, left-right and top-down directions of the vehicle body frame 11 that have been detected may be used by the motor control apparatus 4.

Figure 8:
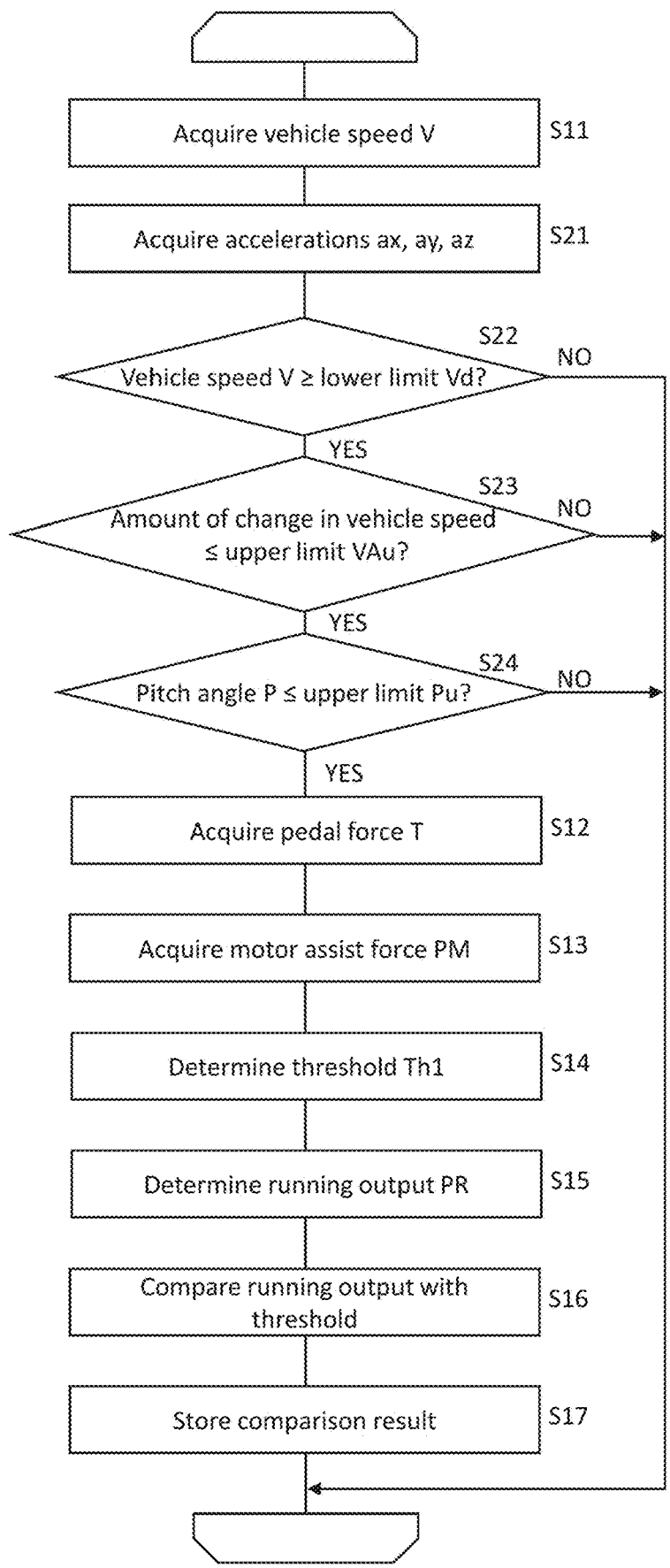
FIG. 8 is a flow chart showing a variation of the process to detect an unauthorized alteration.

FIG. 8 is a flow chart showing a variation of the process to detect an unauthorized alteration. FIG. 8 is a variation of the process shown in FIG. 4. That is, FIG. 8 is a variation of the process denoted by S2 to S4 shown in FIG. 3. The process shown in FIG. 8 is repeated with a set cycle.

In the implementation shown in FIG. 8, the threshold determination unit 6 acquires a vehicle speed V detected by the vehicle speed sensor 1 (S11). The UA detection unit 7 acquires accelerations in the three directions detected by the acceleration sensor 8, ax, ay and az (S21).

The UA detection unit 7 determines whether the vehicle speed V is not lower than a predetermined lower limit Vd (V Vd) (S22). If NO at step S22, i.e., V<Vd, then, the threshold determination unit 6 and UA detection unit 7 do not perform subsequent steps S23, S24 and S12 to S17. That is, if V<Vd, the process for determining a UA determination threshold Th1 and determining the running output PR and comparing them is not performed. Thus, as the comparison process is not performed if the vehicle speed V does not fall within a predetermined range, process efficiency will be improved. For example, if the vehicle speed V is in a low speed range that is not higher than Vd, there may be only small necessity for, and/or advantages of, detection of an unauthorized alteration. As the comparison process is not performed when the vehicle speed is in a range with small necessity or advantages, process efficiency will be increased.

If it is determined YES at step S22, the UA detection unit 7 determines whether the amount of change in the vehicle speed V, VA, is not larger than a predetermined upper limit VAu (VA VAu) (S23). If NO at step S23, i.e., VA>VAu, then, the threshold determination unit 6 and UA detection unit 7 do not perform the subsequent steps S24 and S12 to S17. At step S23, it is determined whether the vehicle speed V is constant. The upper limit VAu for the amount of change VA in the vehicle speed V is set to the maximum that still enables the unit to determine that the vehicle speed V is constant. The amount of change VA in the vehicle speed V may be the amount of change in the vehicle speed V within a predetermined latest period of time. The amount of change VA in the vehicle speed V may be, for example, the difference between the maximum and minimum of the vehicle speed V detected within a cycle. Alternatively, the amount of change VA in the vehicle speed V may be the derivative of the vehicle speed V or the acceleration ax in the front-rear direction (i.e., direction of travel), detected within a cycle.

If the UA detection unit 7 determines that the vehicle speed V is constant, it performs the comparison process; if it determines that the vehicle speed V is not constant, it does not perform the comparison process. Thus, the results of the comparison under the condition that the vehicle speed V is constant are used to determine an unauthorized alteration. If the vehicle speed V of the electric motor-assisted bicycle 10 is not constant, e.g., the electric motor-assisted bicycle 10 is accelerating, then, the running output PR relative to the vehicle speed V increases. Thus, even if there has been no unauthorized alteration, the running output PR relative to the vehicle speed V may increase so as to exceed the UA determination threshold Th1 for the current vehicle speed V. By limiting the comparison process so that it is only performed under the condition that the vehicle speed is constant, false detection of an unauthorized alteration will be less likely to occur.

In lieu of step S23, for example, the weight of a result of the comparison for a constant vehicle speed V may be made more than the weight of a result of the comparison for a vehicle speed V that is not constant, thus preventing the occurrence of false detection in a similar manner.

If YES at step S23, the UA detection unit 7 determines whether the pitch angle P is not larger than an upper limit Pu (P Pu) (S24). If NO at step S24, i.e., P>Pu, then, the threshold determination unit 6 and UA detection unit 7 do not perform subsequent steps S12 to S17. At step S24, it is determined whether the electric motor-assisted bicycle 10 is travelling on a flat road. The upper limit Pu for the pitch angle P is set to the maximum that still enables the unit to determine that the electric motor-assisted bicycle 10 is travelling on a flat road. The pitch angle P may be calculated, for example, based on the acceleration in the front-rear direction, ax, and the acceleration in the top-bottom direction, az, detected by the acceleration sensor 8.

If the UA detection unit 7 determines that the electric motor-assisted bicycle 10 is travelling on a flat road, it performs the comparison process; if it determines that the bicycle is travelling on a road that is not flat, it does not perform the comparison process. Thus, the results of comparison under the condition that the electric motor-assisted bicycle 10 is travelling on a flat road are used to determine an unauthorized alteration. When the electric motor-assisted bicycle 10 is travelling on a road that is not flat, e.g., the electric motor-assisted bicycle 10 is climbing a slope, then, the running output PR relative to the vehicle speed V increases. Thus, even if there has been no unauthorized alteration, the running output PR relative to the vehicle speed V may increase so as to exceed the UA determination threshold Th1 for the current vehicle speed V. By limiting the comparison process so that it is only performed under the condition that the electric motor-assisted bicycle 10 is travelling on a flat road, false detection of an unauthorized alteration will be less likely to occur.

The process denoted by S12 to S17 in FIG. 8 may be performed in a similar manner to the process denoted by S12 to S17 in FIG. 3. The process shown in FIG. 8 will enable determining whether there has been an unauthorized alteration based on the results of comparison between running output PR and UA determination threshold Th1 under the condition that the vehicle speed V is constant and the electric motor-assisted bicycle 10 is determined to be travelling on a flat road.

In a further variation, in FIG. 8, at least one of steps S22 to S24 for determining whether the comparison process is to be performed may be omitted. Further, in addition to steps S22 to S24, an additional condition for performing the comparison process may be set. For example, if the amount of vibration of the electric motor-assisted bicycle 10 is above an upper limit, the UA detection unit 7 may determine that the comparison process is not to be performed. The amount of vibration may be, for example, a value based on at least one of the acceleration in the left-right direction, ay, and the acceleration in the top-bottom direction, az, detected by the acceleration sensor 8. For example, the amount of vibration increases while the electric motor-assisted bicycle 10 is travelling off-road. During off-road travel, the running output PR relative to the vehicle speed V is large. By not performing the comparison process when the amount of vibration is large, the results of comparison under a condition that increases the running output PR will be prevented from affecting the determination about an unauthorized alteration.

Further, the UA detection unit 7 may determine whether there has been an unauthorized alteration based on the result of the comparison under the condition that the gear ratio is determined to be 1. For example, in FIG. 8, if the UA detection unit 7 determines that the gear ratio is 1, it may perform the comparison process (e.g., S12 to S17 in FIG. 8); if it determines that the gear ratio is not 1, it may not perform the comparison process. This will enable efficient detection of an unauthorized alteration in which the vehicle speed sensor to detect the rotation of a wheel is reattached so as to detect the rotation of the crankshaft.

In yet another variation, the cycle in which the process shown in FIG. 3 or FIG. 8 is performed may be varied depending on the number of crankshaft rotations Cr. For example, the cycle in which the process of FIG. 3 or FIG. 8 is performed may be reduced as the number of crankshaft rotations Cr increases. This will change the cycle in which the running output PR and UA determination threshold Th1 are acquired depending on the cycle in which the crankshaft is rotated. This will facilitate obtaining smoothed values of running output PR and other physical quantities, in which variations in the pedal force T and/or the assist force PM by the motor 3 within a cycle in which the crankshaft is rotated have been reduced. It will be understood that, although the cycle in which the running output PR is acquired is equal to the cycle in which the running output PR is compared with the UA determination threshold Th1 in the implementations shown in FIGS. 3 and 8, these cycles may be different.

If the UA detection unit 7 determines that there has been an unauthorized alteration, the motor controller 5 controls the motor 3 in a mode responsive to detection of an unauthorized alteration (hereinafter referred to as "UA_Detected mode"). In the UA_Detected mode, the assist force by the motor 3 relative to the pedal force T is restricted as compared with a situation not in the UA_Detected mode (for example, when in the normal mode). For example, in the UA_Detected mode, the upper limit for the output of the motor 3 may be lower than in the normal mode. Alternatively, in the UA_Detected mode, the vehicle speed range in which restrictions on the output of the motor 3 are applied may be shifted to lower speeds.

The motor controller 5 can disable the UA_Detected mode after the electric motor-assisted bicycle 10 has travelled for a predetermined period of time in the UA_Detected mode. When the UA_Detected mode is disabled, the UA detection unit 7 may reset the value indicating the likelihood of an unauthorized alteration stored in the memory. Alternatively, even in the UA_Detected mode, the UA detection unit 7 may compare the running output PR with the UA detection threshold Th1 and update the value indicating the degree of likelihood of an unauthorized alteration in the memory. If the value indicating the degree of likelihood comes within the permissible range, the UA_Detected mode can be disabled.

If it is determined that there has been an unauthorized alteration, the display device 37 of the electric motor-assisted bicycle 10 may display information indicating that an unauthorized alteration has been detected. Further, the display device 37 may display information indicating that the UA_Detected mode has been enabled or disabled.

In the implementation shown in FIG. 1, the crankshaft 41 extends through the drive unit 40; alternatively, the crankshaft 41 may not extend through the drive unit 40. For example, the drive unit 40 may be positioned around the axle 29 of the rear wheel 22, or around the axle 27 of the front wheel 21.

In the above implementation, the vehicle speed sensor 1 detects the rotation of a rotating body that rotates as the electric motor-assisted bicycle travels. The vehicle speed sensor 1 is not limited to that implementation. For example, the vehicle speed sensor 1 may be an acceleration sensor that detects the acceleration in the direction of travel of the electric motor-assisted bicycle 10 (i.e., front-rear direction of the vehicle body frame 11).

Although preferred embodiments of the present invention have been described, the above-described preferred embodiments are exemplary only. Accordingly, the present invention is not limited to the above-described preferred embodiments, and the above-described preferred embodiments, when carried out, may be modified as appropriate without departing from the spirit of the present invention.

All examples and conditional language recited herein are intended for pedagogical purposes to aid the reader in understanding the principles of the present invention and the concepts contributed by the inventors to furthering the art, and are to be construed as being without limitation to such specifically recited examples and conditions, nor does the organization of such examples in the specification relate to a showing of the superiority and inferiority of the present invention. Although the preferred embodiments of the present invention have been described in detail, it should be understood that the various changes, substitutions, and alterations could be made hereto without departing from the spirit and scope of the invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric motor-assisted bicycle comprising:
a vehicle speed sensor to detect a vehicle speed of the electric motor-assisted bicycle;
a torque sensor to detect a pedal force on a pedal connected to a crankshaft of the electric motor-assisted bicycle;

a motor to generate an assist force that assists the pedal force;

at least one of a processor or an electronic circuit programmed or configured to define and function as:
 a motor controller configured or programmed to control the assist force by the motor depending on the pedal force and the vehicle speed;
 a threshold determiner configured or programmed to determine an unauthorized alteration determination threshold depending on the vehicle speed; and
 an unauthorized alteration detector configured or programmed to determine whether an unauthorized alteration has been made to the vehicle speed sensor or the torque sensor by comparing a running output and the unauthorized alteration determination threshold determined depending on the vehicle speed; wherein the running output is a sum of the assist force by the motor and the pedal force; and when the unauthorized alteration detector determines that an unauthorized alteration has been made, a predetermined control is performed to address the unauthorized alteration.

2. The electric motor-assisted bicycle according to claim 1, wherein the unauthorized alteration detector determines whether the unauthorized alteration has been made based on a result of the comparison between the running output and the unauthorized alteration determination threshold under a condition that the vehicle speed is constant.

3. The electric motor-assisted bicycle according to claim 1, wherein the unauthorized alteration detector determines whether the unauthorized alteration has been made based on a result of the comparison between the running output and the unauthorized alteration determination threshold under a condition that the vehicle speed is constant and a condition that the electric motor-assisted bicycle is determined to be travelling on a flat road.

4. The electric motor-assisted bicycle according to claim 1, wherein the unauthorized alteration detector determines whether the unauthorized alteration has been made based on a result of the comparison between the running output and the unauthorized alteration determination threshold when at least one of the vehicle speed and an acceleration in a direction of travel of the electric motor-assisted bicycle meets a predetermined condition.

5. The electric motor-assisted bicycle according to claim 1, wherein the unauthorized alteration detector determines whether the unauthorized alteration has been made by cyclically acquiring the running output and the unauthorized alteration determination threshold a plurality of times and comparing the running output and the unauthorized alteration determination threshold a plurality of times.

6. The electric motor-assisted bicycle according to claim 5, wherein the unauthorized alteration detector changes a cycle in which the running output and the unauthorized alteration determination threshold are acquired depending on a number of rotations of the crankshaft.

7. The electric motor-assisted bicycle according to claim 5, wherein the unauthorized alteration detector determines that the unauthorized alteration has been made when a time in which the running output is above the unauthorized alteration determination threshold is longer than a time in which the assist force is generated without the running output being above the unauthorized alteration determination threshold.

8. The electric motor-assisted bicycle according to claim 5, wherein the unauthorized alteration detector calculates, for each of the plurality of comparisons, a value indicating a degree of likelihood of an unauthorized alteration based on a result of the comparison, and determines that an unauthorized alteration has been made when, for the plurality of comparisons, a cumulative value indicating the degree of likelihood of an unauthorized alteration exceeds a permissible range.

9. The electric motor-assisted bicycle according to claim 8, further comprising:
 a power switch to control a power supply to the motor between on and off; and
 a memory to store data; wherein
 the unauthorized alteration detector stores in the memory the cumulative value indicating the degree of likelihood of the unauthorized alteration; and
 the cumulative value indicating the degree of likelihood of the unauthorized alteration is stored in the memory even when the power switch is turned off.

10. The electric motor-assisted bicycle according to claim 8, wherein the unauthorized alteration detector calculates, for each of the plurality of comparisons between the running output and the unauthorized alteration determination threshold, the value indicating the degree of likelihood of the unauthorized alteration based on the result of the comparison in which the value is weighted based on at least one of the vehicle speed and the running output.

11. The electric motor-assisted bicycle according to claim 1, wherein the unauthorized alteration detector detects the unauthorized alteration based on a result of a comparison between the running output and the unauthorized alteration determination threshold when the vehicle speed is within a predetermined target range.

12. The electric motor-assisted bicycle according to claim 1, wherein the threshold determiner determines the unauthorized alteration determination threshold such that the unauthorized alteration determination threshold increases as the vehicle speed increases for at least a portion of an entire expected vehicle speed range of the electric motor-assisted bicycle.

13. The electric motor-assisted bicycle according to claim 1, wherein, when the unauthorized alteration detector determines that the unauthorized alteration has been made, the motor controller controls the assist force by the motor in a mode responsive to detection of the unauthorized alteration.

14. A motor control apparatus to control a motor that generates an assist force that assists a pedal force on a pedal of an electric motor-assisted bicycle, the motor control apparatus comprising at least one of a processor or an electronic circuit programmed or configured to execute steps of:
 controlling the assist force by the motor depending on the pedal force and a vehicle speed, in which a torque sensor detects the pedal force on the pedal and a vehicle speed sensor detects the vehicle speed;
 determining an unauthorized alteration determination threshold depending on the vehicle speed; and
 detecting an unauthorized alteration to the vehicle speed sensor or the torque sensor by comparing a running output and the unauthorized alteration determination threshold determined depending on the vehicle speed; wherein the running output is a sum of the assist force by the motor and the pedal force; and when it is determined that an unauthorized alteration has been made, the motor control apparatus performs a predetermined control to address the unauthorized alteration.

* * * * *